May 31, 1932.  T. J. YATES  1,861,170
VALVE TRIPPING MECHANISM
Original Filed March 21, 1929  2 Sheets-Sheet 1
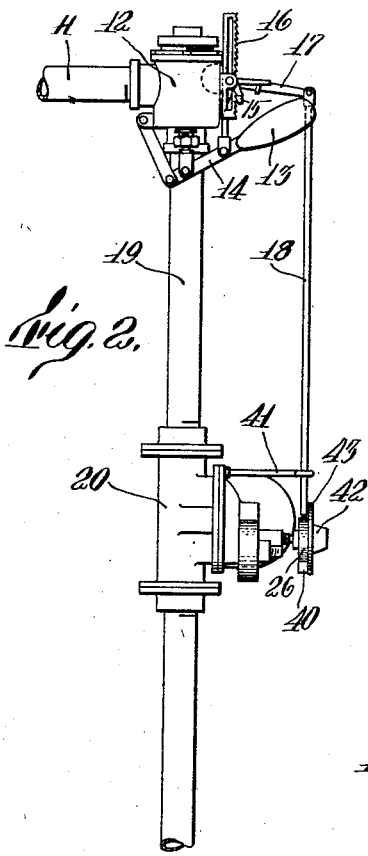
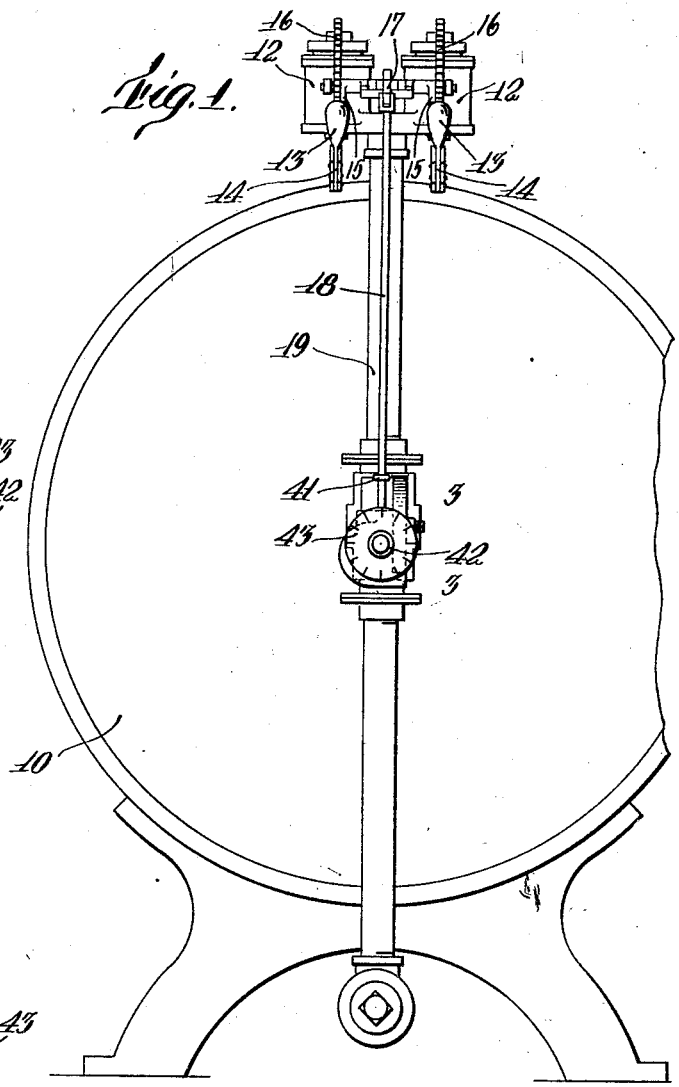
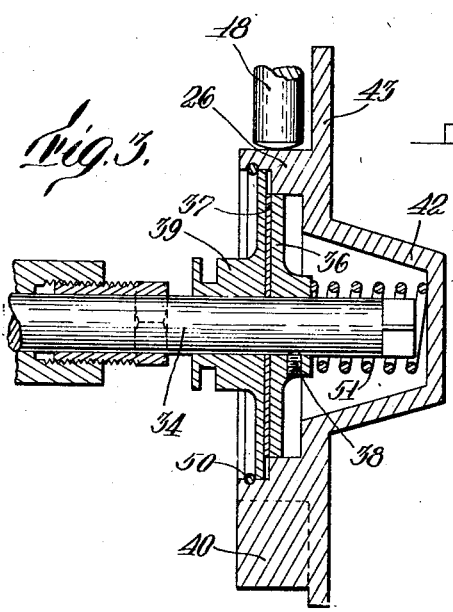
Inventor
Thomas J. Yates May 31, 1932.     T. J. YATES     1,861,170

VALVE TRIPPING MECHANISM

Original Filed March 21, 1929    2 Sheets-Sheet 2

Inventor
Thomas J. Yates

Patented May 31, 1932

1,861,170

UNITED STATES PATENT OFFICE

THOMAS J. YATES, OF SALEM, MASSACHUSETTS, ASSIGNOR TO YATES MACHINE COMPANY, OF SALEM, MASSACHUSETTS, A CORPORATION OF MASSACHUSETTS

VALVE TRIPPING MECHANISM

Application filed March 21, 1929, Serial No. 348,968. Renewed October 19, 1931.

This invention relates to mechanism for performing some such operation as closing a valve or actuating a signal when a predetermined quantity of fluid has flowed past a given point in a pipe. The invention is exemplified in tripping mechanism which is capable of operating as an adjunct to or in combination with a self-closing valve to control the supply of water to washers such as are commonly used in laundries. Valves of the type mentioned may be set in selected positions to regulate the flow of both hot and cold water into the washer, a catch being provided which may be tripped or released to permit springs or weights to close the valves and stop the flow of water into the washer. An object of the invention is to provide reliable mechanism which can be set so as to trip the valves when a predetermined regulable quantity of water has entered the washer.

For a more complete disclosure of the invention, reference may be had to the description which follows, and to the drawings of which,—

Figure 1 is an end view of a washing machine showing an installation of my valve tripping mechanism in conjunction with an automatic valve.

Figure 2 is a fragmentary section of the mechanism shown in Figure 1.

Figure 3 is a section on line 3—3 of Figure 1, the parts being shown on a larger scale.

Figure 4:
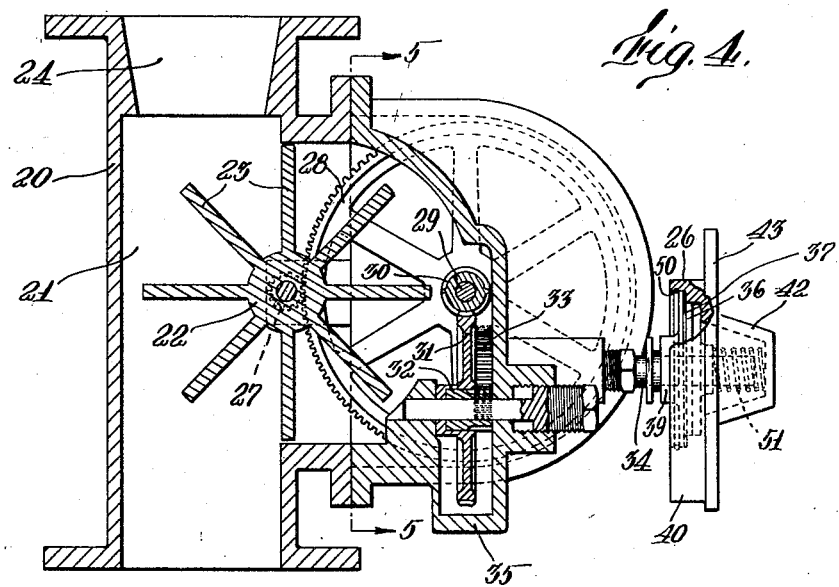
Figure 4 is a sectional view of the valve tripping apparatus showing a portion of the gearing.

Referring to the drawings in detail, 10 represents an end of a cylindrical washing machine such as is in common use in power laundries. In the course of washing a batch of clothes or materials, frequent changes of water are required, the quantities of water for the different changes being varied according to the nature of the step in the washing operation. In order to avoid the necessity of careful attention on the part of an operator during the inflow of water and to ensure the correct amount of water being used for each change, automatic valves may be supplied for the hot and cold water. The water may be supplied to a pair of pipes 11 which lead into a pair of valve chambers 12, suitable valves being arranged therein so as to be closed by the gravitational fall of respective weights 13. Valves of this general type are on the market, the particular valve illustrated in Figures 1 and 2 being fully described and illustrated in my copending application Serial No. 275,230 filed May 4, 1928. The weights 13 are formed on operating levers 14 which are held in adjusted up-raised positions as by a pair of pawls 15, each of which engages a tooth of the racks 16. These racks permit the independent opening of the hot and cold water supply valves to any desired degree. When the desired amount of water has been introduced into the washer 10, it is desirable that the valves 12 be closed thereupon automatically. The valves may be closed by an upward movement of a tripping lever 17 through a push rod 18. The lever 17 simultaneously disengages the two pawls 15 and permits the weights 13 to drop under gravity, closing the valves 12 simultaneously.

Figure 5:
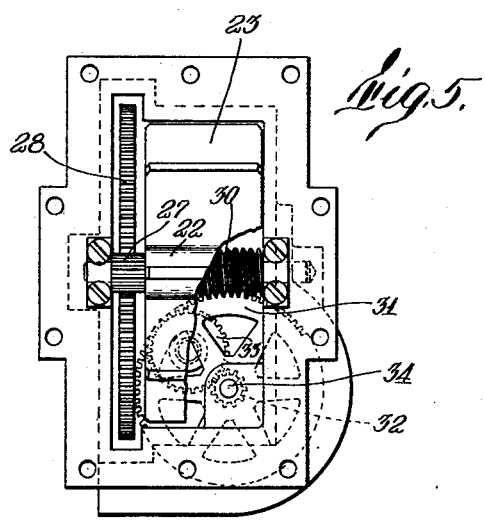
Figure 5 is a section on line 5—5 of Figure 4.
Figure 6:
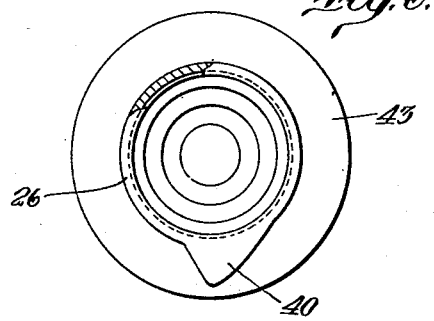
Figure 6 is an elevation of the adjustable cam for operating the trip rod.

According to the present invention I supply improved mechanism for actuating the push rod 18 so as to raise the trip lever 17 when a desired quantity of water has entered the washer 10, and thus to close the valves 12. To this end I connect into the pipe 19 which extends from the valves 12 into the washer 10, a coupling 20 which forms a chamber 21. A suitable paddle wheel 22 is provided having paddles 23 projecting into the chamber 21 from a side thereof in such a manner that water flowing therethrough will impinge on the paddles 23 so as to rotate the wheel 22. In order to increase the velocity of the stream striking the paddles 23 I may provide a tapering inlet port 24 which if desired may be still further reduced in cross section by the insertion of a tapered sleeve 25 therein. The paddle wheel 22 may be connected to a suitable edge cam 26 by a train of reduction gearing so that rotation of the wheel 22 results in a very slow rotation of the cam member 26. As shown in Figures 4 and 5, this reduction gearing has a small pinion 27 fixed on the wheel 22, the wheel and pinion being loosely mounted on a fixed shaft 220. The pinion 27 meshes with a comparatively large gear wheel 28 mounted on a shaft 29 which also carries a worm 30 meshed with a worm gear 31. The worm gear 31 is provided with a pinion 32 which meshes with a gear wheel 33, the latter being mounted on the end of a shaft 34 which extends outwardly through the housing 35 within which the gear train is enclosed.

Figure 7:
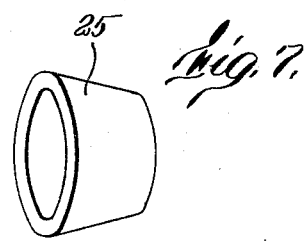
Figure 7 shows in perspective a tapering sleeve which may be fitted into the inlet port of the apparatus.

On the outer portion of the shaft 34 may be fixed a disk 36 having a friction face 37 of leather or other equivalent material. The disk 36 may be fixed to the shaft 34 as by a set screw 38, a key or other device, or may be formed integrally with the shaft. Opposed to the friction face 37, a second disk 39 is loosely mounted on the shaft 34, the disk 39 being secured within a circular recess in the face of the cam member 26, as by a spring ring 50. A compression spring 51 may be provided to press the disk against the friction face 37 and thus to avoid undesirable slippage between the cam member 26 and its shaft 34. The edge of the cam member 26 is preferably circular for the most part, there being a portion 40 extending radially outward from the axis of the shaft 34. As shown in Figure 2, the parts are so arranged that the lower end of the rod 18 rests upon the edge cam surface of the member 26, being held thereon as by a suitable guide 41. As the paddle wheel 22 is rotated by the stream of water flowing through the pipe 19 to enter the washer 10, the rotation of the paddle wheel 22 results in a slow rotation of the cam member 26 so that eventually the lower end of the rod 18 rides on the elevated portion 40 of the cam until the trip lever 17 is sufficiently raised to disengage the pawls 15 from the racks 16 and thus to permit the valves 12 to close, shutting off inflow of hot and cold water into the washer 10. The amount of water entering the washer will thus, under ordinary circumstances, be proportional to the angle of rotation of the cam member 26. Thus the amount of water which may flow into the washer 10 before the inflow is cut off may be determined by suitably setting the cam member 26 before the valves 12 are opened. For this purpose a suitable finger piece 42 may be formed on the cam member 26 or secured thereto, this finger piece being preferably provided with a coaxial disk 43 having small marks thereon preferably calibrated to indicate quantities of water in terms of any suitable unit. Thus prior to opening the valves 12, the cam member 26 may be set to any desired figure. The mechanism may then be left to itself and will automatically close the valves when the desired quantity of water has flowed into the washer 10. In ordinary practice, the valves 12 are regularly opened up to admit a large stream of water to flow into the washer in order to get the water in as quickly as possible and to economize in time. The stream impinging on the paddles 23 will therefore ordinarily be of fairly constant magnitude. I have found, however, that the apparatus will operate with a high degree of accuracy through a very considerable variation in the rate of flow of water through the chambers 21. The calibration of scale marks on the disk 43 may be altered, if desired, by insertion of a sleeve 25 such as is illustrated in Figure 7 in the inlet port just above the chamber 21. The local constriction results in a stream of higher velocity at that point, which increases the speed of rotation of the paddle wheel 22 for a given flow of water and consequently increases the angle of rotation of the cam member 26 corresponding to a given quantity of water entering the washer.

Having thus described certain embodiments of this invention, it should be evident to those skilled in the art that various changes and modifications might be made therein without departing from its spirit or scope as defined by the appended claims.

I claim:

1. A mechanism of the class described comprising a fixed shaft, a paddle wheel having paddles loosely mounted on said shaft, a cam shaft, a cam frictionally mounted thereon for adjustive rotation relative thereto, gearing operatively connecting said wheel and cam shaft, a follower bearing on the cam surface of said cam, and means for directing a stream of fluid against said paddles to rotate said wheel.

2. Valve tripping mechanism adapted to be connected into a fluid supply pipe, said mechanism comprising a casing having a passageway for fluid with inlet and outlet ends opening into said pipe and of substantially the same cross sectional area as said pipe, a shaft mounted in said casing a paddle wheel loosely mounted on said shaft having paddles projecting into said passageway, said passageway having a tapering bore adjacent to its inlet end to constrict the stream impinging on said paddles, a cam shaft, a train of gearing connecting said paddle wheel and said cam shaft, a cam frictionally and adjustably mounted on said cam shaft, and a cam follower in operative contact with said cam.

In testimony whereof I have affixed my signature.

THOMAS J. YATES.